United States Patent [19]

Hemel et al.

[11] Patent Number: 5,149,742
[45] Date of Patent: Sep. 22, 1992

[54] HEAT CURABLE ADHESIVES BASED ON POLYMERS HAVING A POLYBUTADIENE CHAIN BACKBONE AND CONTAINING HYDROXYL GROUPS

[75] Inventors: Richard Hemel, Monheim-Baumberg, Fed. Rep. of Germany; Julius Herold, Gettysburg, Mich.; Hans-Juergen Buecken, Monheim; Peter Hofmann, Duesseldorf, both of Fed. Rep. of Germany

[73] Assignee: Henkel Kommanditgesellschaft auf Aktien, Duesseldorf-Holthausen, Fed. Rep. of Germany

[21] Appl. No.: 278,701

[22] Filed: Dec. 1, 1988

[30] Foreign Application Priority Data

Dec. 4, 1987 [DE] Fed. Rep. of Germany ....... 3741165

[51] Int. Cl.⁵ .............................. C08F 8/34; C08F 8/30
[52] U.S. Cl. .................................... 525/124; 524/426; 524/432; 524/433; 524/436; 525/346
[58] Field of Search ............... 525/123, 124, 130, 131, 525/346; 524/426, 432, 433, 456

[56] References Cited

U.S. PATENT DOCUMENTS

| | | | |
|---|---|---|---|
| 3,329,650 | 7/1967 | Albin | 525/346 |
| 4,165,421 | 8/1979 | Graham | 528/75 |
| 4,343,339 | 8/1982 | Schwindt et al. | 152/209 |

FOREIGN PATENT DOCUMENTS

| | | |
|---|---|---|
| 0009613 | 4/1980 | European Pat. Off. |
| 058800 | 5/1979 | Japan . |
| 050018 | 4/1980 | Japan . |
| 212239 | 12/1982 | Japan . |
| 6811073 | 8/1979 | U.S.S.R. . |
| 1046166 | 10/1966 | United Kingdom . |

OTHER PUBLICATIONS

C.A. 98(20):162261m (SU-OS 99 25 46).
C.A. 97(6):128615z (JA-OS 80/125171).
C.A. 86(20):141828p (JA-OS 77/14638).
C.A. 85(12):78704g (JA-OS 76/6897).
C.A. 82(4):18331m (JA-OS 76/6840).

*Primary Examiner*—Christopher Henderson
*Attorney, Agent, or Firm*—Ernest G. Szoke; Wayne C. Jaeschke; Norvell E. Wisdom, Jr.

[57] ABSTRACT

Heat curable adhesives, based on polybutadiene containing hydroxyl groups, which have a content of (a) polybutadiene having a number average molecular weight of from about 1000 to 3500 and OH values in the range from about 20 to 100; (b) blocked multi-isocyanates, (c) sulfur and (d) conventional vulcanization accelerators, an which may also contain conventional, especially mineral, fillers, pigments and/or auxiliaries, show good elasticity behavior and high tensile shear strength after curing and have a relatively low viscosity favorable for processing before curing.

20 Claims, No Drawings

HEAT CURABLE ADHESIVES BASED ON POLYMERS HAVING A POLYBUTADIENE CHAIN BACKBONE AND CONTAINING HYDROXYL GROUPS

FIELD OF THE INVENTION

This invention relates to heat curable adhesives based on polybutadiene chain backbone polymers containing hydroxyl groups.

STATEMENT OF RELATED ART

Heat curable, cold- or hot-pumpable adhesives based on liquid polybutadienes are used for the bonding of metal surfaces, particularly steel sheets in the automotive industry. These adhesives may contain reactive groups, for example hydroxyl or carboxyl groups as substituents on the basic polybutadiene backbone. These adhesives are normally cross-linked by vulcanization, i.e. by the formation of sulfur bridges between the individual polymer chains. However, the elasticity of the vulcanized adhesive compositions now available is inadequate for many applications. Although improvements in elasticity can be obtained by the addition of solid rubber elastomers, the improved elasticity is accompanied by an increase in viscosity, so that the benefits obtained for practically processable viscosities are minimal.

In some other known heat curable systems based on polybutadiene containing hydroxyl groups, diisocyanates, sulfur and, optionally, standard vulcanization accelerators, curing takes place inter alia by reaction of the diisocyanates with the hydroxyl groups. Thus, SU-OS 99 25 46 (C.A. 98 (20): 16 22 61 m) describes a liquid hardener for an NCO-terminated polyurethane prepolymer which consists of an (oligodiene)diol, a catalyst, sulfur and vulcanization accelerators and in which the pot life can be improved by the hardener containing an OH-terminated 1,3-butadiene/piperylene copolymer. JA-OS 80/125171 (Chem. Abstr. 97 (16): 128615 z) describes a coating compound consisting inter alia of OH-terminated polybutadiene, diisocyanate prepolymers, sulfur-containing esters and crosslinking agents. JA-OS 77/14638 (Chem. Abstr. 86 (20): 141828p) describes a thermosetting coating compound of OH-terminated polybutadiene, PAPI, sulfur and vulcanization accelerators. JA-OS 76/6897 (Chem. Abstr. 85 (12): 78704 g) describes the production of high-impact polyamide by polymerization in the presence of sulfur, OH-terminated butadiene and polyisocyanates or isocyanate-terminated polyurethanes. Finally, JA-OS 74/6840 (Chem. Abstr. 82 (4): 18331 m) relates to alkylene oxide/polyisocyanate copolymers which are hardened with sulfur in the presence of polybutadienediol and vulcanization accelerators.

DESCRIPTION OF THE INVENTION

In this description, except in the operating examples or where explicitly otherwise indicated, all numbers describing amounts of ingredients or reaction conditions are to be understood as modified by the word "about".

The present invention provides heat curable adhesives that combine improved elasticity behavior after curing with comparatively low viscosities before curing According to the invention, this object is achieved by heat curable adhesives that comprise:

a) polybutadiene chain backbone polymers having a number average molecular weight of from 1000 to 3500 and OH values in the range from 20 to 100;

b) molecules containing at least two blocked isocyanate groups, denoted hereinafter as "(blocked) multi-isocyanates";

c) sulfur; and d) conventional vulcanization accelerators.

The "OH value" in this application is defined as the number of milligrams of potassium hydroxide per gram of polymer that are required to neutralize the acetic acid formed by treating the polymer with acetic anhydride, then hydrolyzing the resulting polymer.

The adhesives according to this invention can and often do also contain conventional, especially mineral, fillers, pigments and/or auxiliaries.

Polybutadiene chain backbone polymers having the characteristics needed for compositions of the invention are commercially available.

Blocked multi-isocyanates are to be understood to be compounds which react like multi-isocyanates, but only at elevated temperatures, because of their "blocked" isocyanate groups. Products such as these are also known as isocyanate donors or moderators. Typical representatives of blocking groups are described in *Methoden der Organischen Chemie (Houben-Wevl)* Vol. XIV/2, pages 61 to 70 (published by Georg Thieme Verlag, Stuttgart, 1963). For the present invention, preferred blocking groups are primary alcohols, phenols, epsilon-caprolactam, acetoacetic ester, malonic ester, acetyl acetone, phthalimide, imidazole, hydrogen chloride, and hydrogen cyanide.

Diisocyanates are generally preferred as the multi-isocyanates according to this invention. The following are preferred specific examples of multi-isocyanates suitable for use in accordance with the invention: 1,4-diisocyanatobenzene, toluenediisocyanate, 4,4'-methylene-bis-(phenylisocyanate), 1,5-naphthalene diisocyanate, bi-tolylene diisocyanate, 1,3-xylylene diisocyanate, 4,4'-diisocyanato-2,2',5,5'-tetramethyl-1,1'-biphenyl, 5,5'-diisocyanato-2,2',4,4'-tetramethyl-1,1'-biphenyl, hexamethylene diisocyanate, 1,6-diisocyanato-2,2,4,4-tetramethylhexane, 1,6-diisocyanato-2,4,4-trimethylhexane, 1,4-cyclohexane diisocyanate, 1,4-cyclohexane-bis-(methyleneisocyanate), 1,3-bis-(isocyanatomethyl)-cyclohexane, 3-isocyanatomethyl-3,5,5-trimethylcyclohexyl isocyanate (also called isophorone diisocyanate), and dicyclohexylmethane diisocyanate.

Vulcanization accelerators suitable for use in accordance with the invention are known to a skilled worker in the vulcanization field; typical examples are 2-mercaptobenzothiazole, dibenzothiazyldisulfide, 2-mercaptobenzothiazole zinc, tetramethylthiuram disulfide, 2-mercaptobenzothiazole, benzothiazyl-2-cyclohexyl sulfeneamide, benzothiazyl-2-tert-butyl sulfeneamide, benzothiazyl-2-sulfenemorpholide, diphenylguanidine, di-o-tolylguanidine, o-tolylbiguanide and the like.

Conventional, preferably mineral, fillers are often used in the adhesives according to this invention. These may be selected, for example, from calcium carbonate, magnesium aluminum silicate, aluminum silicate hydrate, wollastonite, silica and the like. Typical pigments, for example carbon black, and/or auxiliaries are those known in the elastomer vulcanization field. In addition to the polybutadiene containing hydroxyl groups, polybutadienes free from hydroxyl groups, especially liquid types, may also be incorporated into the adhesives.

The heat curable adhesives mentioned above have the unexpected advantage that their tensile shear strengths are at least 30% higher than those of conventional heat curable adhesives based on OH-terminated polybutadiene.

Modified polybutadiene and blocked diisocyanate are preferably used in the heat curable adhesives in quantities corresponding to an OH/NCO ratio of from 1:1.1 to 1:0.1 and more preferably from 1:0.9 to 1:0.1.

In one preferred embodiment of the invention, OH-terminated polybutadiene is used. In a particularly advantageous embodiment of the invention, the blocked diisocyanate is an isophorone diisocyanate blocked with epsilon-caprolactam.

Particularly preferred are heat curable hotmelts which contain from 5 to 30 parts by weight sulfur and curing accelerator and from 100 to 400 parts by weight fillers, pigments and/or auxiliaries to 100 parts by weight hydroxyl-containing polybutadiene. The sulfur and vulcanization accelerator are preferably used in ratios by weight to one another of from 1:0.8 to 1:1.2.

The invention is illustrated by the following examples, without limiting it thereby.

GENERAL PROCEDURE FOR THE EXAMPLES

1. PRELIMINARY BATCH

Polybutadiene with hydroxyl groups is introduced first and heated to around 130° C. The blocked diisocyanate is added in portions with stirring and dissolved. On completion of the dissolving process, the reaction mixture is allowed to cool to ambient temperature.

2. FINAL BATCH

The final batch composition is best prepared in a Z-kneader.

Predetermined quantities of the preliminary batch are initially introduced into the kneader, followed by addition of the remaining additives, including part of the filler used if any. The reaction mixture is kneaded until homogeneous. The rest of the filler is then incorporated. Finally, the mixture is kneaded for another five minutes.

Alternatively, it is also possible to incorporate the remaining quantity of filler to be added last together with more polybutadiene.

EXAMPLES 1 AND 2

Heat curable adhesives pumpable at 60° C. were prepared from the components shown in Table 1 by the general procedure described above.

The OH-terminated polybutadiene used was a commercially available product having a molecular weight of 1350 ± 150, an OH values of approximately 80, a viscosity of 30 to 90 poises at 45° C., with 90% 1,2-vinyl groups and terminal OH groups. The OH/NCO ratio was 1:0.2 for Example 1 and 1:0.8 for Example 2.

COMPARISON EXAMPLE

A heat curable adhesive was prepared with the same composition as in Example 1, except that no blocked diisocyanate was added. Instead, the calcium carbonate content was increased to bring the composition to 100%.

Table 1 below shows the composition of the Comparison Example 1 and also the performance properties of the adhesives according to the preceding Examples.

It can be seen from Table 1 that the heat curable adhesives according to the invention show superior properties to the Comparison Example in regard to tensile shear strength and elongation at break.

EXAMPLE 3

A heat curable adhesive was prepared as described above from the following components using a commercially available OH-substituted polybutadiene having an average molecular weight of 2800, an OH value of approximately 40 and a viscosity of 7 or less pascal seconds at 25° C.

| | |
|---|---|
| 1,2 polybutadiene with OH | 19.0% |
| Liquid 1,2-polybutadiene without OH | 16.5% |
| Isophorone diisocyanate (blocked with caprolactam) | 4.0% |
| Zinc oxide | 4.0% |
| Calcium oxide | 5.0% |
| Carbon black | 0.5% |
| Sulfur | 6.8% |
| Dibenzothiazoledisulfide | 8.2% |
| Phenolic resin | 4.0% |
| Stabilizer (as in Table 1) | 0.5% |
| Magnesium silicate | 31.5% |
| Total | 100.0% |

TABLE I

| Ingredient | Example 1 | Example 2 | Comparison Example |
|---|---|---|---|
| 1,2-polybutadiene (OH) | 28.0 | 28.0 | 28.0 |
| Isophoronediisocyanate (blocked with epsilon-caprolactam) | 2.0 | 9.0 | — |
| Zinc oxide | 4.0 | 4.0 | 4.0 |
| Calcium oxide | 5.0 | 5.0 | 5.0 |
| Calcium carbonate | 30.5 | 23.5 | 32.5 |
| Magnesium silicate | 25.0 | 25.0 | 25.0 |
| Carbon black | 0.5 | 0.5 | 0.5 |
| Sulfur | 2.0 | 2.0 | 2.0 |
| Dibenzothiazyldisulfide | 2.5 | 2.5 | 2.5 |
| Stabilizer (commercially available phenylene diamine derivative) | 0.5 | 0.5 | 0.5 |
| Totals | 100.0 | 100.0 | 100.0 |
| Physical Properties After Curing for 30 Minutes at 180° C. | | | |
| Tensile shear strength, N/cm$^2$, for 3 mm layer: | 351 | 450 | 200 |
| Elongation at break (%): | 31 | 22 | 13 |
| Breaking strength (N/mm$^2$): | 2.7 | 6.1 | 3.8 |
| Peel strength, N/cm, for Layer Thickness of 3 mm | | | |
| For Peel Initiation: | 224 | 401 | 269 |
| For Tear propogation: | 79 | 84 | 52 |

The OH:NCO ratio for the composition of Example 3 is 1:1.06.

The physical properties of this composition after curing for 30 minutes at 180° C. were:

| | |
|---|---|
| Tensile shear strength, N/cm$^2$ for 0.3 mm layer: | 491 |
| Elongation at break (%): | 28 |
| Breaking strength, N/mm$^2$: | 3.7 |

EXAMPLE 4

A heat curable adhesive was prepared as described above from the following components, using a commercially available polybutadiene having an average molecular weight of 2800, and OH value of 46.6 and a viscosity of 5.0 pascal seconds at 30° C.

| | |
|---|---|
| 1,2-polybutadiene with OH | 20.0% |
| Liquid 1,2-polybutadiene without OH | 17.5% |
| Isophorone diisocyanate (blocked with caprolactam) | 5.0% |
| Zinc oxide | 4.0% |
| Calcium oxide | 5.0% |
| Carbon black | 0.5% |
| Sulfur | 6.0% |
| Dibenzothiazoledisulfide | 4.0% |
| Tetramethylthiuramdisulfide | 1.0% |
| Phenolic resin | 3.0% |
| Stabilizer (as in Table 1) | 0.5% |
| N-(cyclohexyl)-phthalimide | 0.5% |
| Magnesium silicate | 33.0% |
| Total | 100.0% |

The OH:NCO ratio for this composition is 1:1.08.

The tensile shear strength of this composition after hardening for 30 minutes at 180° C., measured on a 3 mm layer, was 98 N/cm$^2$.

What is claimed is:

1. A heat curable adhesive, comprising:
   a) polybutadiene chain backbone polymer having a number average molecular weight of from about 1000 to about 3500 and an OH value in the range from about 20 to about 100;
   b) blocked multi-siocyanate molecules;
   c) sulfur;- and
   d) a vulcanization accelerator.

2. A heat curable adhesive according to claim 1, additionally comprising a filler.

3. A heat curable adhesives according to claim 2, wherein the polybutadiene is a hydroxyl-terminated polybutadiene and the polybutadiene and blocked multi-isocyanate are present in quantities corresponding to an OH/NCO ratio of from about 1:1.1 to about 1:0.1.

4. A heat curable adhesives according to claim 1, wherein the polybutadiene is a hydroxyl-terminated polybutadiene and the polybutadiene and blocked multi-isocyanate are present in quantities corresponding to an OH/NCO ratio of from about 1:1.1 to about 1:0.1.

5. A heat curable adhesive according to claim 3, wherein (i) the sulfur and the total amount of vulcanization accelerator are present in a weight ratio of about 1:0.8 to about 1:1.2; (ii) the sum of the weights of sulfur and vulcanization accelerator is from about 5% to about 30% of the weight of the hydroxyl-containing polybutadiene; and (iii) the total weight of fillers and pigments is from about 100% to about 400% of the weight of the hydroxyl-containing polybutadiene.

6. A heat curable adhesive according to claim 2, wherein (i) the sulfur and the total amount of vulcanization accelerator are present in a weight ratio of about 1:0.8 to about 1:1.2; (ii) the sum of the weights of sulfur and vulcanization accelerator is from about 5% to about 30% of the weight of the hydroxyl-containing polybutadiene; and (iii) the total weight of fillers and pigments is from about 100% to about 400% of the weight of the hydroxyl-containing polybutadiene.

7. A heat curable adhesive according to claim 6, wherein (i) the multi-isocyanates are selected from the group consisting of 1,4-diisocyanatobenzene, toluenediisocyanate, 4,4 '-methylene-bis-(phenylisocyanate), 1,5-naphthalene diisocyanate, bi-tolylene diisocyanate, 1,3-xylylene diisocyanate, 4,4'-diisocyanato-2,2',5,5'-tetramethyl-1,1'-biphenyl, 5,5'-diisocyanato-2,2',4,4'-tetramethyl-1,1'-biphenyl, hexamethylene diisocyanate, 1,6-diisocyanato-2,2,4,4-tetramethylhexane, 1,6-diisocyanato-2,4,4-trimethylhexane, 1,4-cyclohexane diisocyanate, 1,4-cyclohexane-bis-(methyleneisocyanate), 1,3-bis-(isocyanatomethyl)-cyclohexane, 3-isocyanatomethyl-3,5,5-trimethylcyclohexyl isocyanate, dicyclohexylmethane diisocyanate, and mixtures of these; (ii) the blocking groups are selected from the group consisting of primary alcohols, phenols, epsilon-caprolactam, acetoacetic ester, malonic ester, acetyl acetone, phthalimide, imidazole, hydrogen chloride, hydrogen cyanide, and mixtures of these; and (iii) the vulcanization accelerator is selected from the group consisting of 2 -mercaptobenzothiazole, dibenzothiazyldisulfide, 2-mercaptobenzothiazole zinc, tetramethylthiuram disulfide, 2-mercaptobenzothiazole, benzothiazyl-2-cyclohexyl sulfeneamide, benzothiazyl-2-tert-butyl sulfeneamide, benzothiazyl-2-sulfenemorloholide, diphenylguanidine, di-o-tolylguanidine, o-tolylbiguanide, and mixtures of these.

8. A heat curable adhesive according to claim 5, wherein (i) the multi-isocyanates are selected from the group consisting of 1,4-diisocyanatobenzene, toluenediisocyanate, 4,4'-methylene-bis-(phenylisocyanate), 1,5-naphthalene diisocyanate, bitolylene diisocyanate, 1,3-xylylene diisocyanate, 4,4'-diisocyanato-2,2',5,5'-tetramethyl-1,1'-biphenyl, 5,5'-diisocyanato-2,2',4,4'-tetramethyl-1,1'-biphenyl, hexamethylene diisocyanate, 1,6-diisocyanato-2,2,4,4-tetramethylhexane, 1,6-diisocyanato-2,4,4-trimethylhexane, 1,4-cyclohexane diisocyanate, 1,4-cyclohexane-bis-(methyleneisocyanate), 1,3-bis-(isocyanatomethyl)-cyclohexane, 3-isocyanatomethyl-3,5,5-trimethylcyclohexyl isocyanate, dicyclohexylmethane diisocyanate, and mixtures of these; (ii) the blocking groups are selected from the group consisting of primary alcohols, phenols, epsilon-caprolactam, acetoacetic ester, malonic ester, acetyl acetone, phthalimide, imidazole, hydrogen chloride, hydrogen cyanide, and mixtures of these; and (iii) the vulcanization accelerator is selected from the group consisting of 2 - mercaptobenzothiazole, dibenzothiazyldisulfide, 2-mercaptobenzothiazole zinc, tetramethylthiuram disulfide, 2-mercaptobenzothiazole, benzothiazyl-2-cyclohexyl sulfeneamide, benzothiazyl-2-tert-butyl sulfeneamide, benzothiazyl-2-sulfenemorpholide, diphenylguanidine, di-o-tolylguanidine, o-tolylbiguanide, and mixtures of these.

9. A heat curable adhesive according to claim 4, wherein (i) the multi-isocyanates are selected from the group consisting of 1,4-diisocyanatobenzene, toluenediisocyanate, 4,4'-met hylene-bis-(phenylisocyanate), 1,5-naphthalene diisocyanate, bitolylene diisocyanate, 1,3-xylylene diisocyanate, 4,4'-diisocyanato-2,2',5,5'-tetramethyl-1,1'-biphenyl, 5,5-diisocyanato-2,2',4,4'-tetramethyl-1,1'-biphenyl, hexamethylene diisocyanate, 1,6-diisocyanato-2,2,4,4-tetramethylhexane, 1,6-diisocyanato-2,4,4-trimethylhexane, 1,4-cyclohexane diisocyanate, 1,4-cyclohexane-bis-(methyleneisocyanate), 1,3-bis-(isocyanatomethyl)-cyclohexane, 3-isocyanatomethyl-3,5,5-trimethylcyclohexyl isocyanate, dicyclohexylmethane diisocyanate, and mixtures of these; (ii) the blocking groups are selected from the group consisting of primary alcohols, phenols, epsilon-caprolactam, acetoacetic ester, malonic ester, acetyl acetone, phthalimide, imidazole, hydrogen chloride, hydrogen cyanide, and mixtures of these; and (iii) the vulcanization accelerator is selected from the group consisting of 2-mercaptobenzothiazole, dibenzothiazyl-disulfide, 2-mercaptobenzothiazole zinc, tetramethylthiuram disulfide, 2-mercaptobenzothiazole, benzothiazyl-2-cyclohexyl sulfeneamide, benzothiazyl-2-tertbutyl sulfeneamide, benzothiazyl-2-sulfenemorpholide, diphenylguanidine, di-o-tolylguanidine, o-tolylbiguanide, and mixtures of these.

10. A heat curable adhesive according to claim 3, wherein (i) the multi-isocyanates are selected from the group consisting of 1,4-diisocyanatobenzene, toluenediisocyanate, 4,4'-methylene-bis-(phenylisocyanate), 1,5-naphthalene diisocyanate, bitolylene diisocyanate, 1,3-xylylene diisocyanate, 4,4'-diisocyanato-2,2',5,5'-tetramethyl-1,1'-biphenyl, 5,5'-diisocyanato-2,2',4,4'-tetramethyl-1,1'-biphenyl, hexamethylene diisocyanate, 1,6-diisocyanato-2,2,4,4-tetramethylhexane, 1,6-diisocyanato-2,4,4-trimethylhexane, 1,4-cyclohexane diisocyanate, 1,4-cyclohexane-bis-(methyleneisocyanate), 1,3-bis-(isocyanatomethyl)-cyclohexane, 3-isocyanatomethyl-3,5,5-trimethylcyclohexyl isocyanate, dicyclohexylmethane diisocyanate, and mixtures of these; (ii) the blocking groups are selected from the group consisting of primary alcohols, phenols, epsilon-caprolactam, acetoacetic ester, malonic ester, acetyl acetone, phthalimide, imidazole, hydrogen chloride, hydrogen cyanide, and mixtures of these; and (iii) the vulcanization accelerator is selected from the group consisting of 2-mercaptobenzothiazole, dibenzothiazyl-disulfide, 2-mercaptobenzothiazole zinc, tetramethylthiuram disulfide, 2-mercaptobenzothiazole, benzothiazyl-2-cyclohexyl sulfeneamide, benzothiazyl-2-tertbutyl sulfeneamide, benzothiazyl-2-sulfenemorpholide, diphenylguanidine, di-o-tolylguanidine, o-tolylbiguanide, and mixtures of these.

11. A heat curable adhesive according to claim 2, wherein (i) the multi-isocyanates are selected from the group consisting of 1,4-diisocyanatobenzene, toluenediisocyanate, 4,4'-methylene-bis-(phenylisocyanate), 1,5-naphthalene diisocyanate, bitolylene diisocyanate, 1,3-xylylene diisocyanate, 4,4'-diisocyanato-2,2',5,5'-tetramethyl-1,1'-biphenyl, 5,5'-diisocyanato-2,2',4,4'-tetramethyl-1,1'-biphenyl, hexamethylene diisocyanate, 1,6-diisocyanato-2,2,4,4-tetramethylhexane, 1,6-diisocyanato-2,4,4-trimethylhexane, 1,4-cyclohexane diisocyanate, 1,4-cyclohexane-bis-(methyleneisocyanate), 1,3-bis-(isocyanatomethyl)-cyclohexane, 3-isocyanatomethyl-3,5,5-trimethylcyclohexyl isocyanate, dicyclohexylmethane diisocyanate, and mixtures of these; (ii) the blocking groups are selected from the group consisting of primary alcohols, phenols, epsilon-caprolactam, acetoacetic ester, malonic ester, acetyl acetone, phthalimide, imidazole, hydrogen chloride, hydrogen cyanide, and mixtures of these; and (iii) the vulcanization accelerator is selected from the group consisting of 2-mercaptobenzothiazole, dibenzothiazyl-disulfide, 2-mercaptobenzothiazole zinc, tetramethylthiuram disulfide, 2-mercaptobenzothiazole, benzothiazyl-2-cyclohexyl sulfeneamide, benzothiazyl-2-tertbutyl sulfeneamide, benzothiazyl-2-sulfenemorpholide, diphenylguanidine, di-o-tolylguanidine, o-tolylbiguanide, and mixtures of these.

12. A heat curable adhesive according to claim 1, wherein (i) the multi-isocyanates are selected from the group consisting of 1,4-diisocyanatobenzene, toluene diisocyanate, 4,4'-methylene-bis-(phenylisocyanate), 1,5-naphthalene diisocyanate, bitolylene diisocyanate, 1,3-xylylene diisocyanate, 4,4'-diisocyanato-2,2',5,5'-tetramethyl-1,1'-biphenyl, 5,5'-diisocyanato-2,2',4,4'-tetramethyl-1,1'-biphenyl, hexamethylene diisocyanate, 1,6-diisocyanato-2,2,4,4-tetramethylhexane, 1,6-diisocyanato-2,4,4-trimethylhexane, 1,4-cyclohexane diisocyanate, 1,4-cyclohexane-bis-(methyleneisocyanate), 1,3-bis-(isocyanatomethyl)-cyolohexane, 3-isocyanatomethyl-3,5,5-trimethylcyclohexyl isocyanate, dicyclohexylmethane diisocyanate, and mixtures of these; (ii) the blocking groups are selected from the group consisting of primary alcohols, phenols, epsilon-caprolactam, acetoacetic ester, malonic ester, acetyl acetone, phthalimide, imidazole, hydrogen chloride, hydrogen cyanide, and mixtures of these; and (iii) the vulcanization accelerator is selected from the group consisting of 2-mercaptobenzothiazole, dibenzothiazyl-disulfide, 2-mercaptobenzothiazole zinc, tetramethylthiuram disulfide, 2-mercaptobenzothiazole, benzothiazyl-2-cyclohexyl sulfeneamide, benzothiazyl-2-tertbutyl sulfeneamide, benzothiazyl-2-sulfenemorpholide, diphenylguanidine, di-o-tolylguanidine, o-tolylbiguanide, and mixtures of these.

13. A heat curable adhesive according to claim 12, wherein (i) the multi-isocyanate is predominantly isophorone diisocyanate, and (ii) the blocking agent is predominantly ε-caprolactam.

14. A heat curable adhesive according to claim 11, wherein (i) the multi-isocyanate is predominantly isophorone diisocyanate, and (ii) the blocking agent is predominantly ε-caprolactam.

15. A heat curable adhesive according to claim 10, wherein (i) the multi-isocyanate is predominantly isophorone diisocyanate, and (ii) the blocking agent is predominantly ε-caprolactam.

16. A heat curable adhesive according to claim 9, wherein (i) the multi-isocyanate is predominantly isophorone diisocyanate, and (ii) the blocking agent is predominantly ε-caprolactam.

17. A heat curable adhesive according to claim 8, wherein (i) the multi-isocyanate is predominantly isophorone diisocyanate, and (ii) the blocking agent is predominantly ε-caprolactam.

18. A heat curable adhesive according to claim 7, wherein (i) the multi-isocyanate is predominantly isophorone diisocyanate, and (ii) the blocking agent is predominantly ε-caprolactam.

19. A heat curable adhesive according to claim 4, wherein (i) the multi-isocyanate is predominantly isophorone diisocyanate, and (ii) the blocking agent is predominantly ε-caprolactam.

20. A heat curable adhesive according to claim 1, wherein (i) (ii) the multi-isocyanate is predominantly isophorone diisocyanate, and (ii) the blocking agent is predominantly ε-caprolactam.

* * * * *